United States Patent
Mital et al.

(10) Patent No.: US 10,040,029 B2
(45) Date of Patent: Aug. 7, 2018

(54) EFFICIENT LEAN $NO_x$ TRAP REGENERATION WITH ENCHANCED AMMONIA FORMATION

(71) Applicant: GM GLOBAL TECHNOLOGY OPERATIONS LLC, Detroit, MI (US)

(72) Inventors: Rahul Mital, Rochester Hills, MI (US); Jianwen Li, West Bloomfield, MI (US); Andrea De Filippo, Piemonte (IT); Chang H Kim, Rochester, MI (US); Shouxian Ren, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 682 days.

(21) Appl. No.: 14/189,398

(22) Filed: Feb. 25, 2014

(65) Prior Publication Data

US 2015/0238903 A1    Aug. 27, 2015

(51) Int. Cl.
*F01N 3/00* (2006.01)
*F01N 3/10* (2006.01)
(Continued)

(52) U.S. Cl.
CPC ..... *B01D 53/9495* (2013.01); *B01D 53/9409* (2013.01); *B01D 53/9431* (2013.01);
(Continued)

(58) Field of Classification Search
CPC ............. F01N 2610/02; F01N 2610/03; F01N 3/2066; F01N 3/208; F01N 13/02; F01N 3/0842; F01N 3/021; F01N 3/035; F01N 3/0814; F01N 13/009; F01N 2410/00; F01N 2430/06; F01N 9/00; B01D 53/9409; B01D 53/9431; B01D 53/9495; B01D 2258/012; Y02T 10/24; Y02T 10/47
See application file for complete search history.

(56) References Cited

U.S. PATENT DOCUMENTS 6,170,259 B1 *   1/2001   Boegner et al. ................. 60/286
6,173,568 B1 *   1/2001   Zurbig et al. .................... 60/274
(Continued)

*Primary Examiner* — Phutthiwat Wongwian
*Assistant Examiner* — Diem Tran
(74) *Attorney, Agent, or Firm* — Quinn IP Law

(57) ABSTRACT

A method is disclosed of providing a fuel efficient regeneration of an exhaust after-treatment (AT) system that includes a lean oxides of nitrogen ($NO_X$) trap (LNT) and a selective catalytic reduction filter (SCRF) positioned downstream of the LNT. The method includes regulating a selectable position valve. The valve permits a first gas flow portion to pass through the LNT and diverts a remaining second portion of exhaust gas flow from a first passage connecting an engine and the AT system to a second exhaust passage to thereby bypass the LNT. The method also includes regulating a first device to inject fuel into the first portion of the exhaust gas flow. The injection of fuel in to the first portion of the exhaust gas flow provides fuel efficient regeneration of the LNT and promotes $NO_X$ conversion and ammonia ($NH_3$) formation in the LNT. A system employing the method is also disclosed.

8 Claims, 2 Drawing Sheets

(51) Int. Cl.
*F01N 3/02* (2006.01)
*B01D 53/94* (2006.01)
*F01N 3/08* (2006.01)
*F01N 3/20* (2006.01)
*F01N 9/00* (2006.01)
*F01N 3/021* (2006.01)
*F01N 3/035* (2006.01)
*F01N 13/00* (2010.01)

(52) U.S. Cl.
CPC ............ *F01N 3/021* (2013.01); *F01N 3/035* (2013.01); *F01N 3/0814* (2013.01); *F01N 3/0842* (2013.01); *F01N 3/2066* (2013.01); *F01N 9/00* (2013.01); *F01N 13/009* (2014.06); *B01D 2258/012* (2013.01); *F01N 2410/00* (2013.01); *F01N 2430/06* (2013.01); *F01N 2610/02* (2013.01); *F01N 2610/03* (2013.01); *Y02T 10/24* (2013.01); *Y02T 10/47* (2013.01)

(56) References Cited

U.S. PATENT DOCUMENTS

| | | | |
|---|---|---|---|
| 7,213,395 B2 * | 5/2007 | Hu et al. | 60/286 |
| 7,334,400 B2 * | 2/2008 | Yan et al. | 60/286 |
| 7,472,545 B2 * | 1/2009 | Hemingway | F01N 3/0814 60/286 |
| 7,650,746 B2 * | 1/2010 | Hu et al. | 60/286 |
| 7,900,441 B2 * | 3/2011 | Mital et al. | 60/286 |
| 8,776,498 B2 * | 7/2014 | Gandhi et al. | 60/286 |
| 8,904,763 B2 * | 12/2014 | Raatz | 60/286 |

* cited by examiner

2

EFFICIENT LEAN $NO_x$ TRAP REGENERATION WITH ENCHANCED AMMONIA FORMATION

TECHNICAL FIELD

The present disclosure is drawn to a system and a method for efficient lean $NO_X$ trap (LNT) regeneration with enhanced ammonia formation in an internal combustion engine after-treatment (AT) system.

BACKGROUND

Various exhaust after-treatment devices, such as particulate filters and other devices, have been developed to effectively limit exhaust emissions from internal combustion engines.

One of the exhaust after-treatment devices frequently used in a modern lean burn internal combustion engine, such as a compression-ignition type, is a $NO_X$ adsorber or lean $NO_X$ trap (LNT). The LNT generally functions as a filter for oxides of nitrogen or $NO_X$ a gaseous emission formed as a byproduct of the reaction of nitrogen and oxygen gases in the air after combustion. The LNT removes $NO_X$ molecules from the exhaust stream by trapping and storing them internally during operation of the engine—in effect acting as a molecular sponge.

Once the LNT becomes full, no more $NO_X$ can be adsorbed by the device. In order for the LNT to adsorb more $NO_X$, the adsorber must be purged or regenerated to restore its storage capacity. Such regeneration of the LNT is typically accomplished via injection of fuel directly into the exhaust gas that passes through the device.

SUMMARY

A method is disclosed of providing a fuel efficient regeneration of an exhaust after-treatment (AT) system that includes a lean oxides of nitrogen ($NO_X$) trap (LNT) and a selective catalytic reduction filter (SCRF) in fluid communication with and positioned downstream of the LNT. The method includes regulating via a controller a selectable position valve. The valve permits a first portion of an exhaust gas flow to pass through the LNT while diverting a remaining second portion of the exhaust gas flow. The second portion of the exhaust gas flow is diverted from a first exhaust passage, which is configured to carry the exhaust gas flow from an internal combustion engine for introduction into the AT system, to a second exhaust passage to thereby bypass the LNT.

The second exhaust passage is in fluid communication with the first exhaust passage at a first junction upstream of the LNT and at a second junction between the LNT and the SCRF catalyst, and is thereby configured to provide an LNT bypass for the exhaust gas flow. The method also includes regulating via the controller a first device positioned in the first exhaust passage between the first junction and the LNT to inject an amount of fuel into the first portion of the exhaust gas flow. The injection of the fuel into the first portion of the exhaust gas flow provides fuel efficient regeneration of the LNT and promotes $NO_X$ conversion and ammonia ($NH_3$) formation in the LNT.

The valve may be a two-way valve positioned between the first and second junctions. In such a case, regulating the valve via the controller may include selectively opening and closing the second exhaust passage.

The valve may be a three-way valve positioned at the first junction. In such an alternative case, regulating the valve via the controller may include restricting the first passage and correspondingly permitting the second portion of the exhaust gas flow to pass through the second exhaust passage.

The AT system may additionally include a second device in fluid communication with the SCRF catalyst. The method may additionally include regulating via the controller the second device to inject a reductant into the exhaust gas flow between the LNT and the SCRF catalyst.

The second device may be positioned between the second junction and the SCRF catalyst.

The SCRF catalyst may include a wash-coat filter configured to reduce $NO_X$ emissions present in the first portion of the exhaust gas flow with the ammonia formed in the LNT. In such a case, the act of reducing of $NO_X$ emissions may be accomplished via the wash-coat filter in absence of a reductant injected into the exhaust gas flow.

The act of regulating the first device may include injecting the amount of fuel into the first exhaust passage during the regeneration of the LNT to provide a fuel-rich first portion of the exhaust gas having a lambda ($\lambda$) parameter, in the range of 0.90-0.95. As understood by those skilled it the art, the $\lambda$ parameter is an indicator of proportion of fuel to air in the exhaust gas flow.

The method may also include varying via the controller the $\lambda$ parameter of the fuel-rich first portion of the exhaust gas.

The first portion of the exhaust gas flow may be in the range of 5-50% of the entire exhaust gas flow, i.e., the exhaust gas flow introduced into the AT system from the internal combustion engine.

The internal combustion engine may be a compression-ignition or diesel engine.

A system employing the above-disclosed method is also provided.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
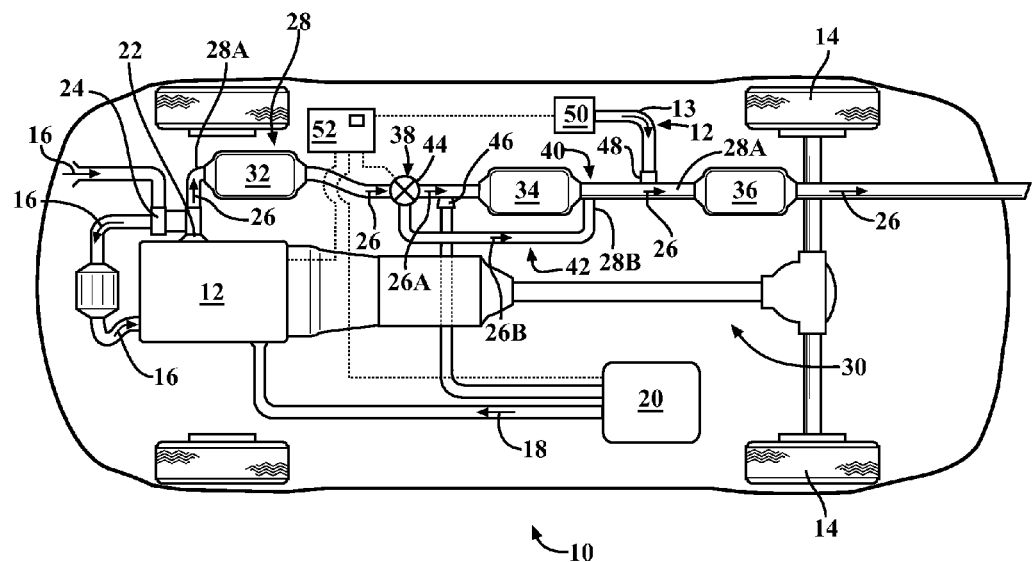
FIG. 1 is a schematic plan view of a vehicle having an internal combustion engine connected to an exhaust system having an after-treatment (AT) system for reducing exhaust emissions that includes a lean $NO_X$ trap (LNT) and a selective catalytic reduction filter (SCRF).
Figure 2:
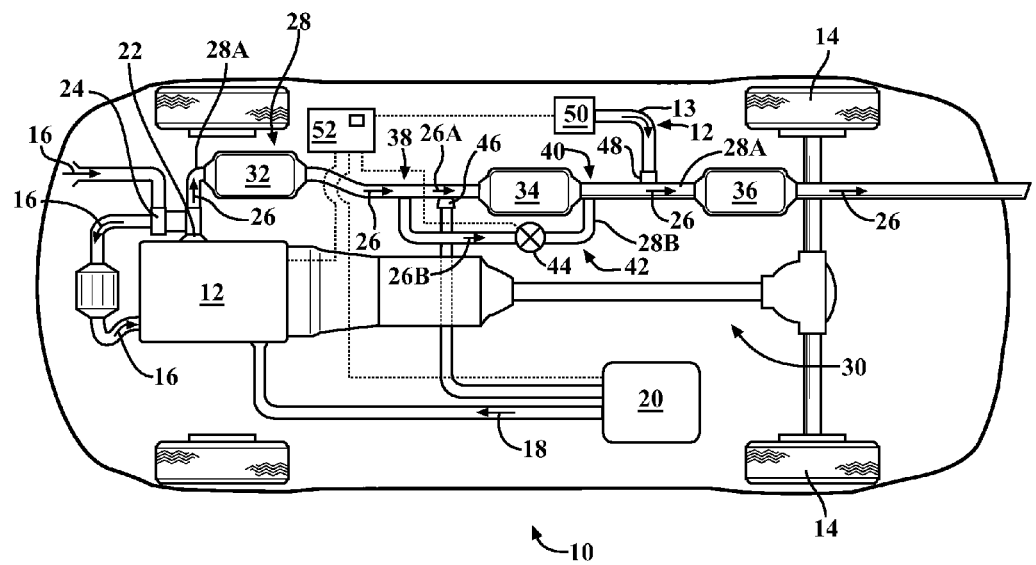
FIG. 2 is a schematic plan view of the vehicle shown in FIG. 1, illustrating an alternative embodiment of the AT system.

Referring to the drawings, wherein like reference numbers refer to like components throughout the several views, FIGS. 1 and 2 schematically depict a motor vehicle 10. The vehicle 10 includes an internal combustion engine 12 configured to propel the vehicle via driven wheels 14. Although the internal combustion engine 12 may be a spark-ignition type, specific reference throughout the ensuing disclosure will be made to a compression-ignition or diesel type of an engine. As understood by those skilled in the art, internal combustion in the diesel engine 12 occurs when a specific amount of ambient air flow 16 is mixed with a metered amount of fuel 18 supplied from a fuel tank 20 and the resultant air-fuel mixture is compressed inside the engine's cylinders (not shown).

As shown, the engine 12 includes an exhaust manifold 22 and a turbocharger 24. The turbocharger 24 is energized by an exhaust gas flow 26 that is released by individual cylinders of the engine 12 through the exhaust manifold 22 following each combustion event. The turbocharger 24 is connected to a first passage 28A of an exhaust system 28 that receives exhaust gas flow 26 and eventually releases the gas flow to the ambient, typically on a side or aft of the vehicle 10. Although the engine 12 is depicted as having the exhaust manifold 22 attached to the engine structure, the engine may include exhaust passages (not shown) such as generally formed in exhaust manifolds. In such a case, the above passages may be incorporated into the engine structure, such as the engine's cylinder head(s). Furthermore, although the turbocharger 24 is shown, nothing precludes the engine 12 from being configured and operated without such a power augmentation device.

The vehicle 10 also includes an engine exhaust aftertreatment (AT) system 30. The AT system 30 includes a number of exhaust after-treatment devices configured to methodically remove largely carbonaceous particulate byproducts and emission constituents of engine combustion from the exhaust gas flow 26. As shown in FIGS. 1 and 2, the AT system 30 operates as part of the exhaust system 28, and may include a diesel oxidation catalyst (DOC) 32. The primary function of the DOC 32 is reduction of carbon monoxides (CO) and non-methane hydrocarbons (NMHC). When present, the DOC 32 is additionally configured to generate nitrogen dioxide ($NO_2$), which may be used by a lean $NO_X$ trap (LNT) 34 and a selective catalytic reduction filter (SCRF) 36 that are arranged remotely downstream of the DOC 32 and described in greater detail below. The DOC 32 typically contains a catalyst substance made up of precious metals, such as platinum and/or palladium, which function therein to accomplish the above-noted objectives. Generally, with respect to generation of $NO_2$, the DOC 32 becomes activated and reaches operating efficiency at elevated temperatures. Therefore, as shown in FIGS. 1 and 2, the DOC 32 may be close-coupled to the turbocharger 24 in order to reduce loss of thermal energy from the exhaust gas flow 26 prior to the gas reaching the DOC.

Either directly from the engine 12 or following the DOC 32, the exhaust gas flow 26 proceeds to the LNT 34 via the first exhaust passage 28A. Typically, the LNT 34 includes a ceramic honeycomb substrate structure with a catalyzed wash-coat, i.e., mixed with active precious metal, that is applied to channels of the substrate. The LNT 34 is configured to reduce oxides of nitrogen or $NO_X$ that are emitted by the engine 12 in the exhaust gas flow 26 as a byproduct of the reaction of nitrogen and oxygen gases in the air following a combustion event. The LNT 34 removes $NO_X$ molecules from the exhaust gas flow 26 by trapping and storing them internally during operation of the engine 12, thus acting like a molecular sponge. The LNT 34 continues to collect $NO_X$ molecules during operation of the engine 12 until the trap is full. Once the LNT 34 becomes full, and in order for it to be capable of adsorbing more $NO_X$, the trap must be purged or regenerated to restore its storage capacity. Such regeneration of the LNT 34 is typically accomplished via injection of hydrocarbons, i.e., fuel, directly into the exhaust gas flow 26 upstream of the trap.

After passing through the LNT 34, the exhaust gas flow 26 is directed to the SCRF 36 via the first exhaust passage 28A. The SCRF 36 may be configured as a 1-way filter, which filters particulate matter or soot, or a 2-way filter, which includes a catalyzed wash-coat, and carries two functions—filters particulate matter and reduces $NO_X$. The SCRF 36 is configured to convert nitrogen oxides ($NO_X$) into diatomic nitrogen ($N_2$) and water ($H_2O$) with the aid of the $NO_2$ generated by the DOC 32. For effective removal of $NO_X$, the SCR conversion process additionally requires a predetermined amount of ammonia ($NH_3$) to be present in the exhaust gas flow 26 that is produced by the LNT 34 and fuel-rich exhaust gas flow 26.

The exhaust system 28 also includes a second exhaust passage 28B. The second exhaust passage 28B is in fluid communication with the first exhaust passage 28A at a first junction 38 arranged upstream of the LNT 34 and at a second junction 40 arranged between the LNT and the SCRF 36. The second exhaust passage 28B is configured to receive the exhaust gas flow 26 from the first exhaust passage 28A at the first junction 38 and reintroduce the exhaust gas into the first exhaust passage 28A at the second junction 40. The second exhaust passage 28B is thereby configured to provide an LNT bypass 42 for at least a portion of the exhaust gas flow 26. The LNT bypass 42 is configured to facilitate a fuel efficient regeneration of the LNT 34 when coupled with an injection of hydrocarbons into the exhaust gas flow 26 that passes through the LNT, as will be described in greater detail below.

The AT system 30 additionally includes a selectable position valve 44 in fluid communication with the first and second exhaust passages 28A, 28B. The valve 44 is configured to permit a first portion 26A of the exhaust gas flow 26 to pass through the LNT 34 and selectively divert a remaining second portion 26B of the exhaust gas flow from the first exhaust passage 28A to the second exhaust passage 28B to thereby bypass the LNT. The valve 44 is employed in the regeneration of the LNT 34, as will be described in greater detail below. The valve 44 may be a two-way valve positioned between the first junction 38 and the second junction 40, as shown in FIG. 2. Such a two-way valve 44 would then be configured to selectively open and close the second exhaust passage 28B. As an alternative, the valve 44 may be a three-way valve positioned at the first junction 38 that is configured to restrict the first exhaust passage 26A and correspondingly permit the second portion 26B of the exhaust gas flow 26 to pass through the second exhaust passage 28B, as shown in FIG. 1. The AT system 30 also includes a first device 46 that is positioned in the first exhaust passage 28A between the first junction 38 and the LNT 34. The first device 46 is configured to inject hydrocarbons or fuel supplied from the fuel tank 20 into the first exhaust passage 28A.

The SCR conversion process may additionally require a controlled or metered amount of a reductant having a general name of "diesel-exhaust-fluid" (DEF) when the reductant is employed in diesel engines. The reductant may be an aqueous solution of urea that includes water and ammonia. Accordingly, the AT system 30 may also include a second device 48 in fluid communication with the SCRF 36 and positioned downstream of the second junction 40 and upstream of the SCRF for injecting the reductant into the exhaust gas flow 26, as shown in FIGS. 1 and 2. As shown, the reductant is provided to the second device 48 between the LNT 34 and the SCRF 36 from a reservoir 50. The reductant accesses the SCRF 36 from the second device 48 as the first portion 26A and the second portion 26B of the exhaust gas flow 26 reunite at the second junction 40. In the case of the previously described SCRF 36 which includes the catalyzed wash-coat filter 36A configured to attract the reductant, inside the SCRF the reductant may interact with the exhaust gas flow 26 in the presence of NO and $NO_2$ and generate a chemical reaction to reduce $NO_X$ emissions from the engine 12. Thus, an injection of the reductant via the second device 48 may be employed to augment ammonia produced during regeneration of the LNT 34. After passing through the SCRF 36, the exhaust gas flow 26 is deemed to be sufficiently cleaned of the $NO_X$ emissions and may then be allowed to exit the exhaust system 28 to the atmosphere.

The AT system 30 also includes a controller 52. The controller 52 may be a stand-alone unit, or be part of an electronic controller that regulates the operation of engine 12. The controller 52 is arranged on the vehicle 10 and includes a processor and a readily accessible non-transitory memory. Instructions for controlling operation of the AT system 30 are programmed or recorded in the memory of the controller 52 and the processor is configured to execute the instructions from the memory during operation of the vehicle 10. The controller 52 is also programmed to regenerate the LNT 34. As noted above, during operation of the engine 12, when the LNT 34 becomes full, and in order for it to be capable of adsorbing more $NO_X$, the LNT must be purged or regenerated to restore its storage capacity. In order to regenerate the LNT 34, the controller 52 is programmed to regulate the valve 44 such that the first portion 26A of the exhaust gas flow 26 is passed through the LNT 34 and the remaining second portion 26B of the exhaust gas flow is diverted from the first exhaust passage 28A to the second exhaust passage 28B to thereby bypass the LNT. Thus controlled, the first portion 26A may be in the range of 5-50% of the entire exhaust gas flow 26 introduced into the AT system 30 from the engine 12.

Additionally, the controller 52 is programmed to inject a predetermined amount of fuel via the first device 46 into the first portion 26A of the exhaust gas flow 26 upstream of the LNT 34 during regeneration of the LNT. Such injection of additional fuel into the first exhaust passage 28A during the regeneration of the LNT 34 makes the first portion 26A of the exhaust gas flow 26 fuel-rich in comparison to the second portion 26B that sees no additional hydrocarbons. Thus enriched first portion 26A of the exhaust gas flow 26 desorbs the $NO_X$ particles that have been trapped in the LNT 34. As understood by those skilled in the art, a lambda ($\lambda$) parameter is used as an indicator of proportion of fuel to air in an exhaust gas flow from an internal combustion engine. A $\lambda$ parameter having a value of 1.0 defines a mixture having a stoichiometric fuel-air ratio; a $\lambda$ parameter having a value greater than 1.0 defines a lean mixture; and a $\lambda$ parameter having a value less than 1.0 defines a mixture that is fuel-rich. Accordingly, the controller 52 is configured to vary or adjust the $\lambda$ parameter of the first portion 26A of the exhaust gas by adjusting the amount of diesel fuel injected by the first device 46 into the first portion 28A of the exhaust gas flow 26.

During regeneration of the LNT 34, the resultant $\lambda$ parameter of the first portion 26A may be in the range of 0.90-0.95. Such control of the fuel-air ratio of the first portion 26A is intended to provide fuel efficient regeneration of the LNT 34, because only the first portion 26A of the exhaust gas flow is so affected. Typically, about 50% of additional fuel will be required to make only the first portion 26A fuel-rich, as compared to the amount of fuel that would be required to enrich the entire exhaust gas flow 26. However, a greater amount of fuel may be injected into the first portion 26A to generate a greater amount of ammonia and achieve more efficient regeneration of the LNT 34. Additionally, the fuel-rich, i.e., reduced $\lambda$, first portion 26A of the exhaust gas flow 26 passing through the LNT 34 promotes $NO_X$ conversion and ammonia formation therein.

Because ammonia is typically used for the SCR reaction, as described above, the ammonia formed during regeneration of the LNT 34 may be used downstream to reduce $NO_X$ in the 2-way filter type of SCRF 36. The amount of ammonia formed during regeneration of the LNT 34 may be sufficient to facilitate the requisite reduction of the $NO_X$ emissions present in the second portion 26B of the exhaust gas flow 26 by the SCRF 36 without any additional reductant being injected into the exhaust gas flow 26 via the second device 48. In such a case, the AT system 30 employing the SCRF 36 with the catalyzed wash-coat filter 36A may be able to operate in the absence of the second device 48. When the second device 48 is present in the AT system 30, however, the controller 52 may also be configured to regulate operation of the second device.

Figure 3:
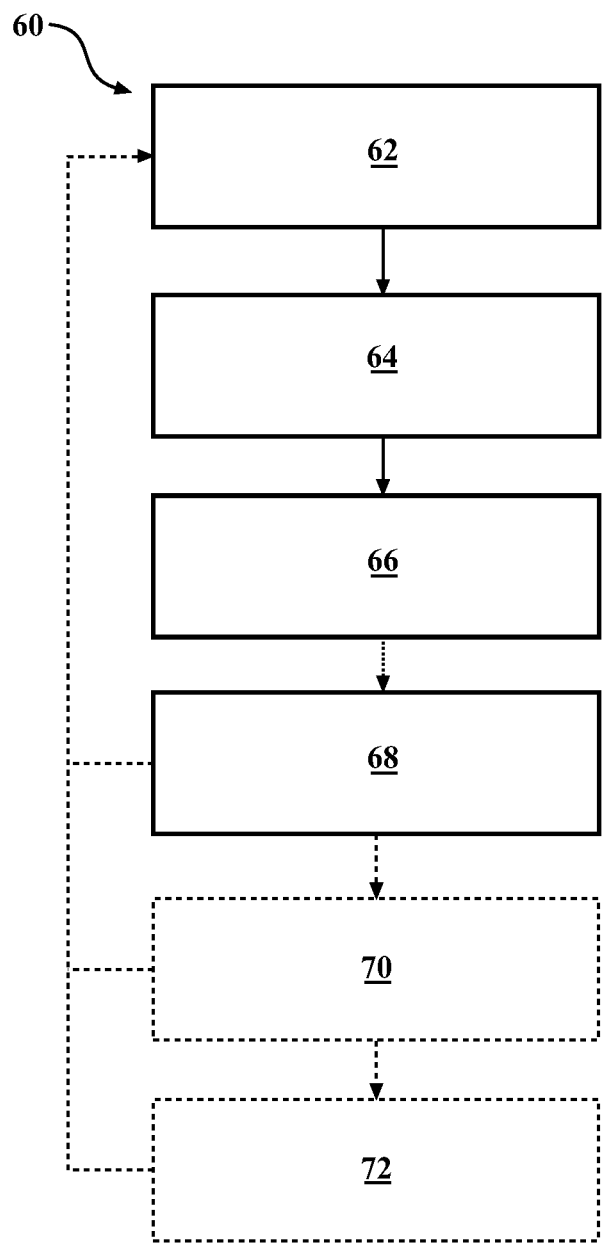
FIG. 3 is a flow diagram of a method of controlling regeneration of the LNT shown in FIGS. 1 and 2.

FIG. 3 depicts a method 60 of providing a fuel efficient regeneration of an exhaust AT system 30, as described above with respect to FIGS. 1 and 2. The method initiates in frame 62 with the controller regulating operation of the engine 12 and the exhaust AT system 30. Following frame 62, the method proceeds to frame 64, where it includes initiating regeneration of the LNT 34. After frame 64, the method advances to frame 66. In frame 66, the method includes regulating via the controller 52 the valve 44 to permit the first portion 26A of the exhaust gas flow 26 to pass through the LNT 34 and divert a remaining second portion 26B of the exhaust gas flow from the first exhaust passage 28A to the second exhaust passage 28B. As described above, such separation of the exhaust gas flow 26 into the first and second portions 26A and 26B permits the second portion 26B to be diverted around the LNT 34 and then be rejoined at the second junction 40 following the LNT bypass 42.

Following frame 66 the method proceeds to frame 68, where the method includes regulating via the controller 52 the first device 46 to inject an amount of fuel into the first portion 26A of the exhaust gas flow 26 to provide fuel efficient regeneration of the LNT 34 and promote $NO_X$ conversion and ammonia formation in the LNT. After frame 68, the method may advance to frame 70, where the controller 52 adjusts the $\lambda$ parameter of the fuel-rich first portion 26A of the exhaust gas 26 via regulating the first device 46. In the case where the AT system 30 includes the second device 48, following frame 70 the method may proceed to frame 72. In frame 72, the method may include the controller 52 regulating the second device 48 to inject the reductant into the exhaust gas flow 26 between the LNT 34 and the SCRF 36, as described above with respect to FIGS. 1 and 2.

Following either frame 68, 70, or 72, the method may loop back to frame 62. Accordingly, the controller 52 may be programmed to continuously monitor the operation of the engine 12 and the AT system 30 to trigger the subsequent regeneration cycle for the LNT 34.

Accordingly, at least some of the envisioned benefits of the disclosed method 60 and apparatus of FIGS. 1-2 may include reduced fuel consumption during the regeneration of the LNT 34, as well as improved efficiency of LNT's reduction of $NO_X$ emissions, because of the already fuel-rich environment within the first portion 26A of the exhaust gas flow 26. Also, because the fuel-rich environment across the LNT 34 promotes formation of $NH_3$, performance of the SCRF 36 will be enhanced.

During operation of the engine 12, due to the sulfur present in the exhaust gas flow 26, active catalyst sites in the LNT 34 can become saturated due to sulfate formation therein. Periodically, in order to maintain efficient operation of the LNT 34 and reduce sulfur-generated odor in the exhaust gas flow 26 that is released to the ambient, such sulfur deposits must be broken down and removed from the surface of LNT 34 by a process of "desulfation". The fuel-rich conditions during desulfation of the LNT 34, however, may generate elevated amounts of NMHC and hydrogen sulfate ($H_2S$) downstream of the LNT. Typically, such elevated amounts of NMHC and $H_2S$ would remain un-oxidized in the AT system 30, while the exhaust gas flow 26 that is released to the ambient becomes accompanied by the characteristic odor of $H_2S$. However, because the LNT bypass 42 reunites the first portion 26A and the second portion 26B of the exhaust gas flow 26 at the second junction 40, the reunited exhaust gas flow 26 as whole becomes fuel-lean. As a result, the fuel-lean exhaust gas flow 26 aft of the LNT bypass 42 is capable of oxidizing the NMHC and converting $H_2S$ into a relatively odor-less sulfur dioxide ($SO_2$).

Additionally, urea injection amount and/or frequency can be reduced for a given period of use of the AT system 30, and the associated hardware can possibly be downsized or eliminated, because the demand on SCRF 36 will be reduced and higher concentration of $NH_3$ produced due to the fuel-rich environment across the LNT 34. Furthermore, it may be possible to meet target performance requirements for the AT system 30 and still reduce the physical size of the LNT 34.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A system for providing a fuel efficient regeneration of an exhaust after-treatment (AT) system, the system comprising:
   a first exhaust passage configured to carry an exhaust gas flow from an internal combustion engine for introduction into the AT system;
   a lean oxides of nitrogen (NOx) trap (LNT) in fluid communication with the first exhaust passage and configured to reduce NOx emissions in the exhaust gas flow;
   a selective catalytic reduction filter (SCRF) in fluid communication with and positioned downstream of the LNT in the exhaust gas flow;
   a second passage in fluid communication with the first exhaust passage at a first junction upstream of the LNT and at a second junction between the LNT and the SCRF catalyst, and thereby configured to provide an LNT bypass for the exhaust gas flow;
   a selectable position valve in fluid communication with the first and second exhaust passages, wherein the valve is a three-way valve positioned at the first junction and configured to restrict the first exhaust passage and correspondingly permit the second portion of the exhaust gas flow to pass through the second exhaust passage;
   a first device positioned in the first exhaust passage between the first junction and the LNT and configured to inject fuel into the first exhaust passage; and
   a controller programmed to regenerate the LNT by:
      regulating the valve to permit a first portion of the exhaust gas flow to pass through the LNT and divert a remaining second portion of the exhaust gas flow from the first exhaust passage to the second exhaust passage to thereby bypass the LNT; and
      regulating the first device to inject an amount of fuel into the first portion of the exhaust gas flow to provide fuel efficient regeneration of the LNT and promote NOx conversion and ammonia ($NH_3$) formation in the LNT.

2. The system of claim 1, further comprising a second device in fluid communication with the SCRF configured to inject a reductant into the exhaust gas flow between the LNT and the SCRF.

3. The system of claim 2, wherein the controller is configured to regulate operation of the second device.

4. The system of claim 1, wherein the SCRF catalyst includes a wash-coat filter configured to reduce NOx emissions present in the second portion of the exhaust gas flow with the ammonia formed in the LNT in absence of a reductant injected into the exhaust gas flow.

5. The system of claim 1, wherein the injected amount of fuel into the first exhaust passage during the regeneration of the LNT provides a fuel-rich first portion of the exhaust gas having a lambda ($\lambda$) parameter in the range of 0.90-0.95.

6. The system of claim 5, wherein the controller is configured to vary the $\lambda$ parameter of the fuel-rich first portion of the exhaust gas.

7. The system of claim 1, wherein the first portion of the exhaust gas flow is in the range of 20-50% of the exhaust gas flow introduced into the AT system from the internal combustion engine.

8. The system of claim 1, wherein the internal combustion engine is a compression-ignition engine.

* * * * *